(12) United States Patent
Ebrahimi Afrouzi

(10) Patent No.: US 11,853,076 B1
(45) Date of Patent: Dec. 26, 2023

(54) VIRTUAL REALITY CONCERT SYSTEM

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 925 days.

(21) Appl. No.: 16/717,212

(22) Filed: Dec. 17, 2019

Related U.S. Application Data

(63) Continuation of application No. 16/041,470, filed on Jul. 20, 2018, now abandoned.

(60) Provisional application No. 62/535,748, filed on Jul. 21, 2017.

(51) Int. Cl.
G05D 1/02 (2020.01)
H04S 7/00 (2006.01)
H04R 1/02 (2006.01)
H04R 5/02 (2006.01)
H04W 4/02 (2018.01)

(52) U.S. Cl.
CPC ......... *G05D 1/0248* (2013.01); *G05D 1/0231* (2013.01); *G05D 1/0274* (2013.01); *G05D 1/0287* (2013.01); *G05D 1/0295* (2013.01); *H04R 1/028* (2013.01); *H04R 5/02* (2013.01); *H04S 7/302* (2013.01); *H04W 4/025* (2013.01); *G05D 2201/0207* (2013.01); *H04R 2205/024* (2013.01)

(58) Field of Classification Search
CPC ..... G05D 1/0011–0044; G05D 1/0287; G05D 1/0291; G05D 1/0293; G05D 1/0295; G05D 2201/0207; H04R 1/028; H04R 5/02; H04R 2205/024; H04S 7/302; H04W 4/025
See application file for complete search history.

(56) References Cited

U.S. PATENT DOCUMENTS

| 4,674,048 | A | 6/1987 | Okumura |
| 5,652,489 | A | 7/1997 | Kawakami |
| 7,162,056 | B2 | 1/2007 | Burl |
| 10,766,324 | B1 * | 9/2020 | Ebrahimi Afrouzi .. B60G 3/145 |
| 2004/0089142 | A1 | 5/2004 | Georges |
| 2008/0031475 | A1 | 2/2008 | Goldstein |
| 2009/0132085 | A1 | 5/2009 | Sjostrand |
| 2012/0197439 | A1 | 8/2012 | Wang |
| 2017/0055100 | A1 | 2/2017 | Wong |

(Continued)

FOREIGN PATENT DOCUMENTS

CN 104244103 A 12/2014

*Primary Examiner* — Aaron L Troost

(57) ABSTRACT

Provided is a system including at least two robots. A first robot includes a chassis, a set of wheels, a wheel suspension, sensors, a processor, and a machine-readable medium for storing instructions. A camera of the first robot captures images of an environment from which the processor generates or updates a map of the environment and determines a location of items within the environment. The processor extracts features of the environment from the images and determines a location of the first robot. The processor transmits information to a processor of a second robot and determines an action of the first robot and the second robot. A smart phone application is paired with at least the first robot and is configured to receive at least one user input specifying an instruction for at least the first robot and at least one user preference.

20 Claims, 2 Drawing Sheets

(56) References Cited

U.S. PATENT DOCUMENTS

| | | | |
|---|---|---|---|
| 2018/0075403 A1 | 3/2018 | Mascorro Medina | |
| 2018/0292827 A1* | 10/2018 | Artes | G01C 21/362 |
| 2018/0297204 A1 | 10/2018 | Krasny | |
| 2019/0310656 A1* | 10/2019 | Suzuki | G06N 7/00 |
| 2020/0042018 A1* | 2/2020 | Chiba | G05D 1/0274 |
| 2021/0103290 A1* | 4/2021 | Pajovic | G05D 1/0287 |

\* cited by examiner

VIRTUAL REALITY CONCERT SYSTEM

CROSS-REFERENCE TO RELATED APPLICATIONS

This application is a Continuation of U.S. Non-Provisional patent application Ser. No. 16/041,470, filed Jul. 20, 2018, which claims the benefit of U.S. Provisional Patent Application No. 62/535,748, filed Jul. 21, 2017, each of which is hereby incorporated by reference.

FIELD OF THE DISCLOSURE

The disclosure generally relates to mobile robotic devices and specifically to user experiences provided with mobile robotic devices.

BACKGROUND

In traditional home music and video entertainment systems, the content is pre-recorded, mixed and then played back to a user. This takes away the aspect of live sound which is given by the direction the sound travels. Successful efforts have been made in theaters to engineer speakers that can capture this aspect of the experience. However, in home theater systems the issue remains that speakers are fixed to a particular location. Improvements can be made to provide the user with a more realistic live sound experience in a home environment.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments include a system, including: at least two robots, wherein a first robot includes: a chassis; a set of wheels coupled to the chassis; a wheel suspension system coupled to each drive wheel; a plurality of sensors; a processor; and a tangible, non-transitory, machine readable medium storing instructions that when executed by the processor effectuates operations including: capturing, with a camera, images of the environment; generating or updating, with the processor, a map of the environment based on at least the images of the environment; determining, with the processor, a location of items within the environment based on at least the images of the environment; extracting, with the processor, features of the environment from the images of the environment; determining, with the processor, a location of the first robot within the environment; transmitting, with the processor, information to a processor of a second robot; determining, with the processor, an action of the first robot and the second robot, wherein the action of the second robot comprises navigating to a particular location; and a smart phone application communicatively paired with at least the first robot configured to: receive at least one user input specifying an instruction for at least the first robot and at least one user preference.

Some embodiments include a system, including: at least two robots, each robot comprising: a chassis; a set of wheels coupled to the chassis; a wheel suspension system coupled to each drive wheel; a plurality of sensors; a processor; and a tangible, non-transitory, machine readable medium storing instructions that when executed by the processor effectuates operations including: capturing, with a camera, images of the environment; generating, with the processor, a map of the environment based on at least the images of the environment; determining, with the processor, a location of items within the environment based on at least the images of the environment; extracting, with the processor, features of the environment from the images of the environment; determining, with the processor, a location of the robot within the environment; transmitting, with the processor, information to a processor of at least one other robot; and receiving, with the processor, information from the processor of the at least one other robot; determining, with the processor, an action of the at least one other robot, wherein the action comprises navigating to a particular location; and a smart phone application configured to: receive at least one user input specifying an instruction for at least one of the at least two robots and at least one user preference.

BRIEF DESCRIPTION OF THE DISCLOSURE

Non-limiting and non-exhaustive features of the present invention are described with reference to the following figures, wherein like reference numerals refer to like parts throughout the various figures.

DETAILED DESCRIPTION OF SOME EMBODIMENTS

Figure 1A:
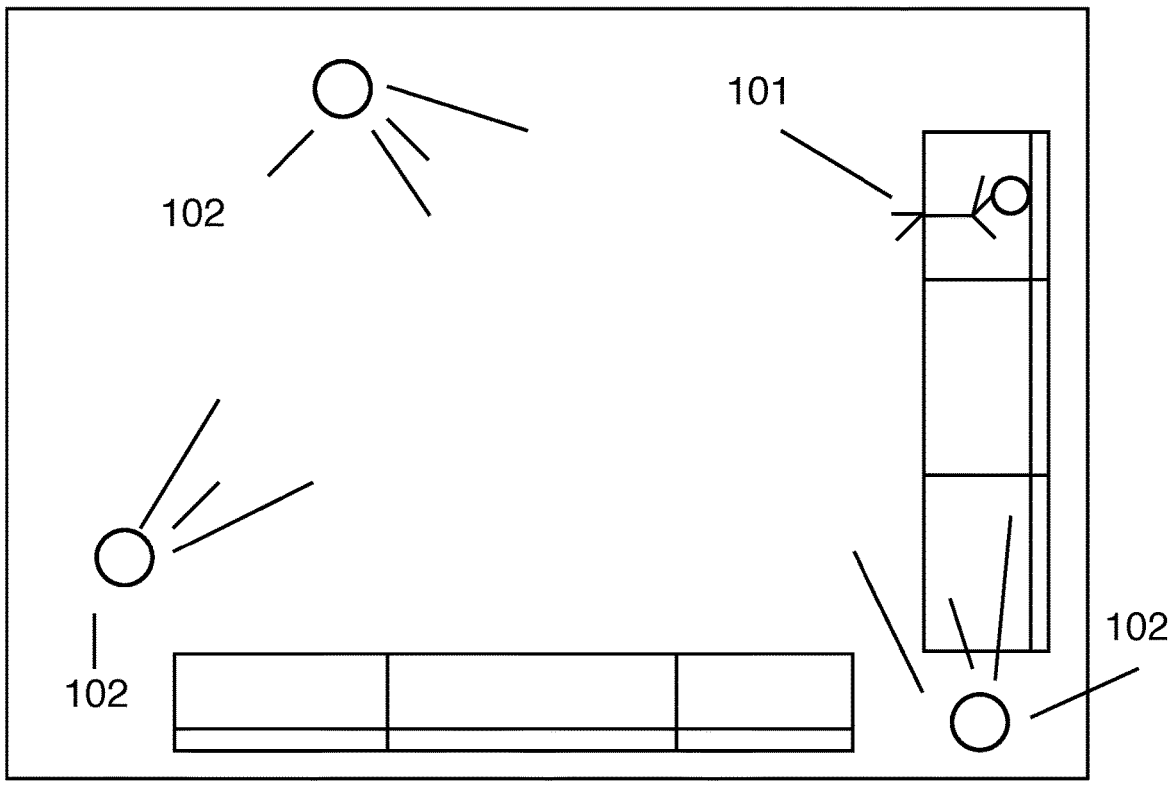
FIG. 1a illustrates an example of a room setup with speakers wherein a user is sitting on a couch and the speakers are angled to give the user the most optimal listening experience.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Although various methods and techniques are described herein, it should be kept in mind that the invention might also cover articles of manufacture that include a computer readable medium on which computer-readable instructions for carrying out embodiments of the inventive methods or technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus may include a specialized computer and/or a dedicated computing device when appropriately programmed and may include a combination of a computer/computing device and dedicated/programmable circuits adapted for the various tasks pertaining to embodiments of the invention.

Some embodiments provide an end user with a live sounding experience for entertainment experiences in a non-theater setting. Some embodiments provide a dynamic entertainment system that offers user preference customization options and utilizes mobile robotic devices which seek out the best location in a given work environment room in order to provide the best sound possible. Some embodiments provide an acoustic listening experience system for a home environment of users using mobile robotic speaker devices. Some embodiments use mobile robotic speakers, a central control system, and offer the user ultimate creativity in the way they wish the music they are listening to sound. In some embodiments, the mobile robotic speakers position themselves or are positioned by a user such that they provide the user with the best acoustic sound. Additionally, in some embodiments, each speaker has a unique instrumental experience, providing a unique sound which other speakers in the system may not provide. In some embodiments, the user has ultimate creative control, having the ability to alter the way the music sounds.

Some embodiments provide the user with a dynamic live sounding experience. Unlike common speakers that are static and stationary to one location, the speakers are mobile robotic devices, and as such can move. In some embodiments, using simultaneous localization and mapping (SLAM) techniques, each speaker maps the environment, communicates with other speakers, and determines the most optimal location for each speaker within the environment. Some embodiments provide the user with an experience similar to a live sound environment such as a concert venue. At these venues, an acoustic "sweet spot" exists. Some embodiments provide the sweet spot to the user by moving the speakers to the most optimal location for a given room. In some embodiments, the mobile robotic speakers traverse the environment and measure soundwaves to determine where the best location for each speaker is. In some embodiments, the user is located and identified to provide the best listening experience. In some embodiments, each speaker measures soundwaves, communicates with other speakers, and sends all data to a central processing control system. In some embodiments, this data is processed to determine the best location for each speaker in relation to the user and the room. In some embodiments, this data is sent back to the speakers for positioning. In some embodiments, when the user moves from one location to another, the speakers adjust themselves to provide the user with the most optimal location based on where the user has moved to.

In some embodiments, each speaker is equipped with image capturing technology. As the mobile robotic speaker traverses the work environment, it captures images of the environment. In some embodiments, the speaker extrapolates features in the room including edges and corners, such as between a ceiling and a wall or a floor and wall and the like. In some embodiments, this information along with data pertaining to the location of the speaker itself is sent to the central control system which processes the data and determines where the walls are in a room. In some embodiments, the central control system determines the size of the room to provide an optimal listening experience. Alternatively, the user measures the room themselves and manually inputs this information via an application paired with the central control system.

In some embodiments, each speaker includes a set of wheels, a suspension system, a chassis, an array of sensors, a central processor, and a communication system, all of which are used in traversing the work environment.

In some embodiments, each speaker and or control system is equipped with a depth camera, LIDAR or range finder, light based or sonar, or equipment for measuring depth of field. In some embodiments, the depth camera consists of a camera and a structured light infrared (IR) transmitter projecting a pattern to the surrounding area. In some embodiments, each speaker creates a partial or full map of the environment. In some embodiments, this is determined based on the field of view (FOV) of the camera and field of emission of the IR transmitter. In some embodiments, time of flight (TOF) sensors can also be used to provide a 2D or 3D map of the environment.

In some embodiments, wherein partial maps are created, a control system combines the partial maps it collects from each speaker and/or itself to stitch together a more comprehensive map of the work environment. The process for this is similar to scan matching mechanisms. The parts in the map that are common are used as a baseline to construct the map which is more complete than each individual partial map.

In some embodiments, the size of the room that the speakers can work in depends on the hardware of the depth camera or sensor used. For example, for a system that needs to work in a larger area, more powerful structured light needs to be emitted into the environment. Also, the resolution of the camera and FOV can affect the map resolution and quality. Therefore, more powerful hardware is required for larger areas while the opposite is true for smaller areas. For example, a more powerful structured light emitter or camera may have the ability to rotate itself or move to provide more accuracy and reliability, but this may be unnecessary for other environments. The specific hardware used will depend on the work environment the present invention is operating in.

In some embodiments, the multiple mobile robotic speakers interact with each other. In some embodiments, they coordinate with each other to achieve the most optimal acoustic "sweet spot" location in regards to where the user is located as well as the design, layout, and acoustics of the room. Additionally, the speakers communicate with a central control system. In some embodiments, the speakers determine, based on installed sensors and cameras, as well as mapping technology, where items in the room are located as well as the layout of the room and approximate size of the room. This information may be pertinent to each mobile robotic speaker as there could be potential interference with the sound or optimal position of the speaker.

In some embodiments, when not in use or when charging is needed, the speakers are stored in a specific location for storage and charging. In some embodiments, for a first use, the user physically places the speaker in the desired storage location. Thereafter, the speaker identifies this location as the home location for charging and storage. In some embodiments, when operational, the speakers identify their location as well as the location of any companion speakers. In some embodiments, when it is time for charging or when it is time to return to base, the speakers drive themselves back to the storage or charging location.

In some embodiments, one or more speakers have a limited rotational or translational movement and some have a static fixed location.

In some embodiments, each speaker has wireless connectivity capability, in the form of Wi-Fi, radio communication, Bluetooth, and the like. Additionally, in some embodiments, a localization mechanism is used to identify its location in respect to the surrounding environment as well as its location in respect to other speakers.

In some embodiments, the central control system is an electronic device or a computer software or a smart phone application. In some embodiments, it can additionally be an application that runs a voice recognition software or an application that runs a vocal command software.

Some embodiments require that all recordings, such as musical recordings, be recorded in its individual capacity down to each instrument. For example, in most musical recordings, all instruments are recorded into a single track or file. Some embodiments herein require that each instrument and portion be recorded individually. Additionally, in some embodiments, instructions for playback are provided in a separate file(s). An additional file is relayed to each speaker which indicates the preferred orientation and location of each speaker in relation to each other and the user to provide a proper live sounding experience. A playback control system configured to understand the coded instruction provided in the file plays each instrument and sound based on how the best sound is configured. Therefore, in some embodiments, the speakers are arranged based on the orientation of the user, the design of the room, the layout of the room, as well as the intention of the musical composer.

In some embodiments, the central control system controls and plays each of the individually recorded tracks on a particular speaker to provide the closest match to the experience the musical composer intends. In some embodiments, the musical composer determines the preferred relation of instruments with respect to one another and this information or preferences are coded into the media as a separate file or run time instructions. In some embodiments, this information is uploaded with the musical files and determines where the speakers will locate themselves.

In some embodiments, the user has ultimate customization capabilities. In some embodiments, the user selects a location where each of the instruments should sound like they were played from. In some embodiments, the user selects particular speakers be placed at particular locations. In some embodiments, the user physically moves the speakers or directs the speaker to move with an application. Additionally, in some embodiments, the user changes and manipulates which speaker plays which particular musical track. In some embodiments, the user overrides the recommended settings from the original composer as well as the central control system. The user can therefore adjust the placement of instruments, adjusting the level of sound of each instrument, splitting the sound of each instrument into two or more sound wave vectors, combining them and the like.

In some embodiments, the user has sound customization options. For example, the user may be able to alter the treble and bass, make adjustments to the equalizer, and the like.

In some embodiments, a user makes a musical genre selection for the tone of the music. For example, a user selects that a song have the tone of rock and roll even though the song was recorded as a jazz song. In this example, even though the song was recorded as a jazz song, the sound played by the speaker sounds like a rock and roll band playing the music. In some embodiments, the system alters the tone of the song when it plays the music.

In some embodiments, when a user uses specific genres and styles of music over a period of time, the system learns the user's preferences. In some embodiments, the system assumes and uses these genres by default when playing a musical composition. Additionally, in some embodiments, the user rates the genre each time a composition is played to assist with determining the user's preferences. In some embodiments, machine learning using deep learning techniques and artificial intelligence is used by the system for predicting the user's preferences. Additionally, in some embodiments, the system learns over time that a user prefers a particular artist's compositions to be played in a particular style or genre of music. For example, the system may determine that the user prefers that songs by a particular band sound like they were played by another band. For example, the system determines that the user likes jazz musical compositions to sound like blues musical compositions.

In some embodiments, a user selects that particular instruments be played in a particular style. For example, a user selects that in all rock songs a guitar be played with heavy distortion.

In some embodiments, the system AI plays songs by one musician and has the song sound like it was played by a different musician. For example, when a user selects a song that is played by band 1, the user selects that they like the way band 1 sounds. The system AI stores this information for future use, including common tones used by the musicians in band 1. The user thereafter plays a song by band 2 and has the system AI make it sound like band 1 played the song. Alternatively, the user selects that only particular instruments in the song by band 2 sound like they were played by band 1 while the remaining instruments are played by band 2, band 3 or so forth.

In some embodiments, the speakers themselves may not be a mobile robotic device, but may be placed on a mobile robotic platform with the abovementioned functionality. In some embodiments, the mobile robotic platform can traverse and map the environment, communicate with other mobile robotic devices, and find the ideal location for the speaker to be located.

In some embodiments, the musical composition is provided with a musical video to go along with the music. In some embodiments, when the user moves the speakers, the corresponding instruments in the music video appear to move as well. This will ensure that the user experience is synced in the video and the sound. In some embodiments, the video of each instrument being played is recorded individually. In some embodiments, background videos of stages of various size and forms are prerecorded. In some embodiments, videos of other environments are also individually pre-recorded and used as fillers. This will be mixed into a final video at run time with the assistance of the system AI. In some embodiments, color enhancement, lighting settings, and other manipulation on the part of the user is used to enhance the user experience. Conversely, the user initially makes selections with regards to the music video, such as where the user would like the musical instrument players to appear, and thereafter the speakers arrange themselves based on the user's video selections.

In some embodiments, a user selects certain images, such as a user's favorite actress, be included in the music video in some manner. In some embodiments, the system AI integrates this selection in a manner to provide a realistic experience for the user.

FIG. 1a illustrates an example of a room setup with speakers, wherein a user 101 is sitting on a couch and the speakers 102 are angled to give the user the most optimal listening experience.

Figure 1B:
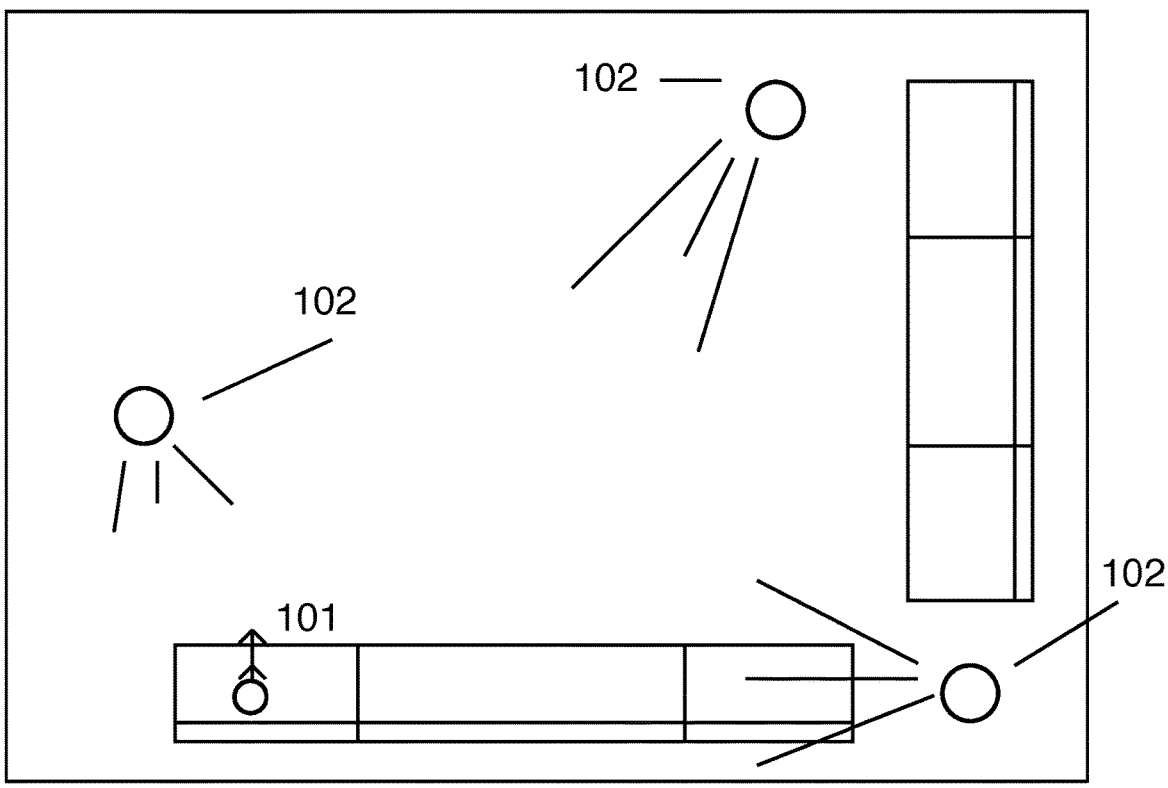
FIG. 1b illustrates an alternate example of a room setup with speakers wherein a user is sitting on a couch and the speakers are angled to give the user the most optimal listening experience

FIG. 1b illustrates an alternate example of a room setup with speakers, wherein a user 101 is sitting on a couch and the speakers 102 are angled to give the user the most optimal listening experience. In this example the user has moved. As the user has moved, the speakers have moved as well to provide the user with the most optimal listening experience.

Figure 2:
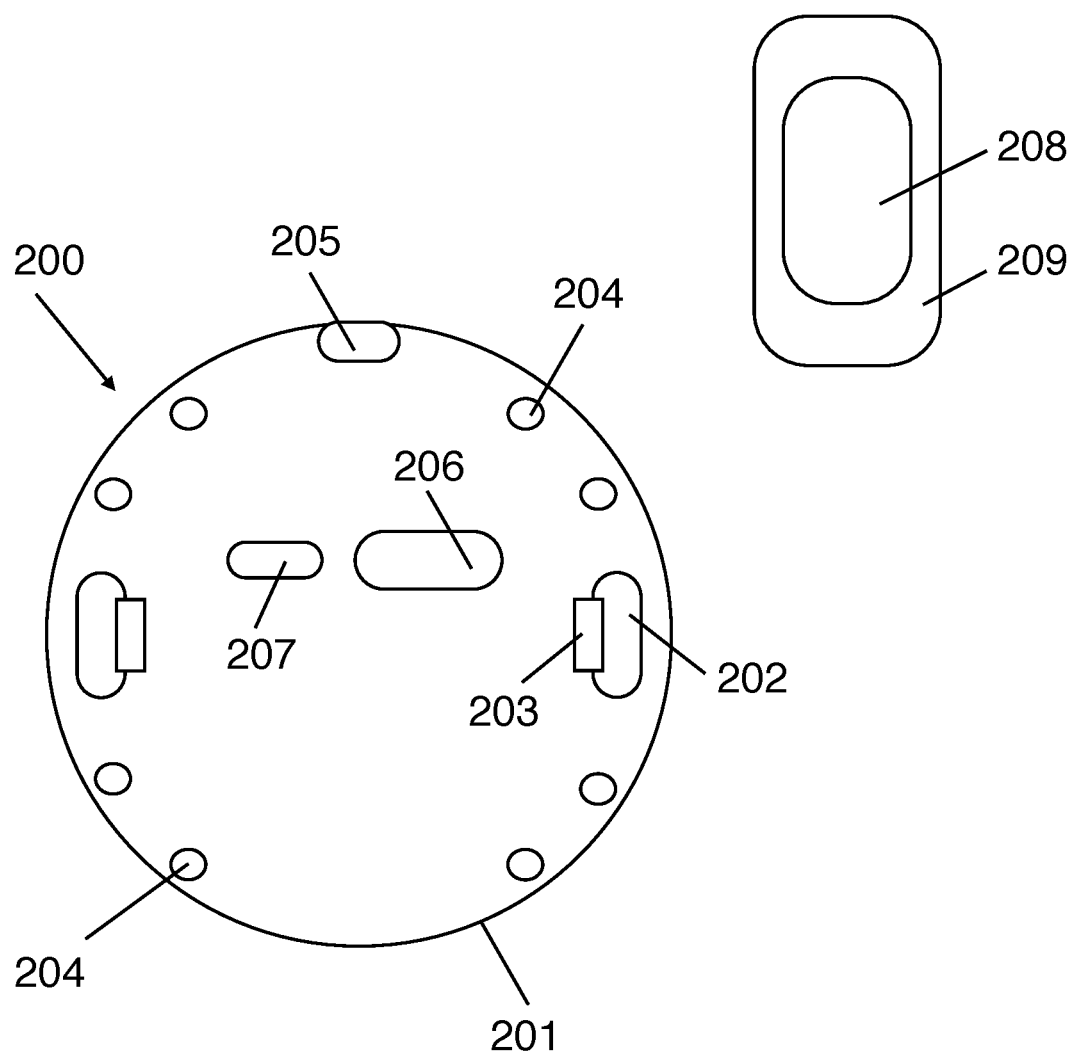

FIG. 2 illustrates a top view of an example of a mobile robotic device 200 including a chassis 201, a set of wheels 202, wheel suspension systems 203, sensors 204 including a camera 205, a processor 206, and a computer-readable medium 207. A smartphone application 208 operating on a smartphone 209 is paired with the mobile robotic device 200.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

The invention claimed is:

1. A system, comprising:
    at least two robots, wherein a first robot comprises:
        a chassis;
        a set of wheel coupled to the chassis;
        a wheel suspension system coupled to each drive wheel;
        a plurality of sensors;
        a processor; and
        a tangible, non-transitory, machine readable medium storing instructions that when executed by the processor effectuates operations comprising:
            capturing, with a camera, images of the environment;
            generating or updating, with the processor of the first robot, a map of the environment based on at least the images of the environment;
            determining, with the processor of the first robot, a location of items within the environment based on at least the images of the environment;
            extracting, with the processor of the first robot, features of the environment from the images of the environment;
            determining, with the processor of the first robot, a location of the first robot within the environment;
            transmitting, with the processor of the first robot, information to a processor of a second robot;
            determining, with the processor of the first robot, an action of the first robot and the second robot, wherein the action of the second robot comprises navigating to a particular location; and
    a smart phone application communicatively paired with at least the first robot configured to:
        receive at least one user input specifying an instruction for at least the first robot and at least one user preference.

2. The system of claim 1, wherein the operations of the first robot further comprise:
    receiving, with the processor of the first robot, information from the processor of the second robot.

3. The system of claim 1, wherein the operations of the first robot further comprise:
    determining, with the processor of the firs robot, a location of the second robot based on at least one of: at least some of the information from the processor of the second robot and at least some data collected by the plurality of sensors.

4. The system of claim 1, wherein the map of the environment incorporates at least a part of a map generated by the processor of the second robot.

5. The system of claim 4, wherein incorporating at least the part of the map of the second robot into the map of the environment comprises:
    matching at least the part of the map of the second robot with data forming the map of the environment; and
    stitching matching points between at least the part of the map of the second robot with the data forming the map of the environment together.

6. The system of claim 1, wherein the second robot uses the information for at least navigation.

7. The system of claim 1, wherein the action of the first robot or second robot is determined based on a location of at least one user.

8. The system of claim 1, wherein the information comprises an instruction for the second robot.

9. The system of claim 8, wherein the instruction comprises an instruction for the second robot to navigate to a particular location.

10. The system of claim 1, wherein the smart phone application is further configured to execute at least one of:
    receiving at least one user input specifying an instruction for at least the first robot to navigate to a particular location;
    displaying a location of at least the first robot;
    learning of user preferences using machine learning techniques;
    recognition of a voice of at least one user;
    receiving a vocal command.

11. The system of claim 1, wherein the features of the environment include at least one of: a corner and an edge.

12. A system, comprising:
    at least two robots, each robot comprising:
        a chassis;
        a set of wheels coupled to the chassis;
        a wheel suspension system coupled to each wheel;
        a plurality of sensors;
        a processor; and
        a tangible, non-transitory, machine readable medium storing instructions that when executed by the processor of a respective robot of the at least two robots effectuates operations comprising:
            capturing, with a camera, images of the environment;
            generating, with the processor of the respective robot, a map of the environment based on at least the images of the environment;
            determining, with the processor of the respective robot, a location of items within the environment based on at least the images of the environment;

extracting, with the processor of the respective robot, features of the environment from the images of the environment;

determining, with the processor of the respective robot, a location of the robot within the environment;

transmitting, with the processor of the respective robot, information to a processor of at least one other robot; and receiving, with the processor of the respective robot, information from the processor of the at least one other robot;

determining, with the processor of the respective robot, an action of the at least one other robot, wherein the action comprises navigating to a particular location; and a smart phone application configured to:
receive at least one user input specifying an instruction for at least one of the at least two robots and at least one user preference.

13. The system of claim 12, wherein the operations of each robot further comprises:
determining, with the processor of the respective robot, a location of the at least one other robot based on at least one of: at least some of the information from the processor of the at least one other robot or at least some data collected by the plurality of sensors.

14. The system of claim 12, wherein the map of the environment incorporates at least a part of a map generated by the processor of the at least one other robot.

15. The system of claim 14, wherein incorporating at least the part of the map of the at least one other robot into the map of the environment comprises:
matching at least some of the information from the processor of the at least one other robot with data forming the map of the environment; and
stitching matching points between at least some of the information from the processor of the at least one other robot with the data forming the map of the environment together.

16. The system of claim 12, wherein the at least one other robot uses the information for at least navigation.

17. The system of claim 12, wherein the action of the at least one other robot is determined based on a location of at least one user.

18. The system of claim 12, wherein the information transmitted to the processor of the at least one other robot comprises an instruction for the at least one other robot.

19. The system of claim 18, wherein the instruction comprises an instruction for the at least one other robot to navigate to a particular location.

20. The system of claim 12, wherein the smart phone application is further configured to execute at least one of:
receiving at least one user input specifying an instruction for at least one robot to navigate to a particular location;
displaying a location of at least one robot;
learning and predicting of user preferences using machine learning techniques;
recognition of a voice of at least one user; and
receiving a vocal command.

* * * * *